US010331349B2

(12) United States Patent
Song et al.

(10) Patent No.: US 10,331,349 B2
(45) Date of Patent: *Jun. 25, 2019

(54) SHRINKING VIRTUAL HARD DISK IMAGE

(71) Applicant: Alibaba Group Holding Limited, Grand Cayman (KY)

(72) Inventors: Zhen-hua Song, Beijing (CN); Qian Wang, Hangzhou (CN); Jia Wan, Hangzhou (CN); Weicai Chen, Hangzhou (CN)

(73) Assignee: Alibaba Group Holding Limited

( * ) Notice: Subject to any disclaimer, the term of this patent is extended or adjusted under 35 U.S.C. 154(b) by 70 days.

This patent is subject to a terminal disclaimer.

(21) Appl. No.: 15/222,945

(22) Filed: Jul. 29, 2016

(65) Prior Publication Data

US 2016/0335018 A1    Nov. 17, 2016

Related U.S. Application Data

(63) Continuation of application No. 13/571,773, filed on Aug. 10, 2012, now Pat. No. 9,501,225.

(30) Foreign Application Priority Data

Aug. 10, 2011    (CN) .......................... 2011 1 0228838

(51) Int. Cl.
*G06F 3/06*    (2006.01)
*G06F 16/16*   (2019.01)
*G06F 16/17*   (2019.01)

(52) U.S. Cl.
CPC ............ *G06F 3/0608* (2013.01); *G06F 3/064* (2013.01); *G06F 3/0623* (2013.01);
(Continued)

(58) Field of Classification Search
CPC .... G06F 3/0608; G06F 3/0623; G06F 3/0631; G06F 3/064; G06F 3/0643
(Continued)

(56) References Cited

U.S. PATENT DOCUMENTS 7,284,109 B1    10/2007    Paxie et al.
7,299,325 B1    11/2007    Waterhouse et al.
(Continued)

FOREIGN PATENT DOCUMENTS

JP    2003228513    8/2003
JP    2005011316    1/2005

OTHER PUBLICATIONS

Chinese Office Action dated Aug. 14, 2015, for Chinese patent application No. 201110228838.2, a counterpart foreign application of U.S. Appl. No. 13/571,773, 7 pages.
(Continued)

*Primary Examiner* — Hosain T Alam
*Assistant Examiner* — Nicholas E Allen
(74) *Attorney, Agent, or Firm* — Lee & Hayes, P.C.

(57) ABSTRACT

The present disclosure introduces a method and an apparatus of shrinking virtual hard disk image file. The present techniques search a garbage data block in a file and revise a record of the garbage data block in a block allocation table (BAT). The file includes one or more data blocks and a BAT that records information of each data block. The garbage data block is a data block that does not store effective data. The present techniques move an effective data block subsequent to the garbage data block, revise a record of the effective data block in the BAT after the moving, and shrink a size of the file after the movement.

20 Claims, 8 Drawing Sheets

(52) U.S. Cl.
CPC .......... *G06F 3/0631* (2013.01); *G06F 3/0643* (2013.01); *G06F 3/0652* (2013.01); *G06F 3/0665* (2013.01); *G06F 3/0671* (2013.01); *G06F 3/0674* (2013.01); *G06F 16/162* (2019.01); *G06F 16/1727* (2019.01); *G06F 2206/1004* (2013.01)

(58) Field of Classification Search
USPC ......................................................... 707/813
See application file for complete search history.

(56) References Cited

U.S. PATENT DOCUMENTS

| | | | |
|---|---|---|---|
| 8,171,201 | B1 | 5/2012 | Edwards, Sr. |
| 8,176,294 | B2 | 5/2012 | Frank |
| 8,694,713 | B2 | 4/2014 | Ginzton |
| 8,819,383 | B1 | 8/2014 | Jobanputra et al. |
| 8,825,725 | B2 | 9/2014 | Watanabe et al. |
| 2005/0027938 | A1 | 2/2005 | Burkey |
| 2005/0141312 | A1 | 6/2005 | Sinclair et al. |
| 2007/0136551 | A1* | 6/2007 | Leis .................. G06F 9/5077 711/173 |
| 2007/0143563 | A1 | 6/2007 | Pudipeddi et al. |
| 2008/0071969 | A1 | 3/2008 | Lin |
| 2009/0087040 | A1 | 4/2009 | Torii et al. |
| 2009/0292737 | A1 | 11/2009 | Hayton |
| 2009/0307455 | A1 | 12/2009 | Pliss et al. |
| 2010/0021085 | A1 | 1/2010 | Kabasawa |
| 2010/0049929 | A1 | 2/2010 | Nagarkar et al. |
| 2010/0057818 | A1 | 3/2010 | Gao et al. |
| 2010/0107163 | A1 | 4/2010 | Lee |
| 2010/0250880 | A1 | 9/2010 | Mimatsu |
| 2010/0280996 | A1 | 11/2010 | Gross, IV et al. |
| 2010/0325351 | A1 | 12/2010 | Bennett |
| 2011/0113194 | A1 | 5/2011 | Terry et al. |
| 2011/0145304 | A1 | 6/2011 | Gray et al. |
| 2011/0154329 | A1 | 6/2011 | Arcese et al. |
| 2012/0005677 | A1 | 1/2012 | Fujiwara |
| 2012/0054743 | A1 | 3/2012 | Fujiwara |
| 2012/0060012 | A1 | 3/2012 | Olszewski et al. |
| 2012/0167080 | A1 | 6/2012 | Vilayannur et al. |
| 2012/0221611 | A1 | 8/2012 | Watanabe et al. |
| 2012/0239896 | A1 | 9/2012 | Sobel |
| 2013/0219069 | A1 | 8/2013 | Yellapragada |
| 2013/0219135 | A1 | 8/2013 | Knowles et al. |
| 2014/0033188 | A1 | 1/2014 | Beavers et al. |
| 2014/0122819 | A1 | 5/2014 | Green et al. |

OTHER PUBLICATIONS

Translated Japanese Office Action dated Aug. 23, 2016 for Japanese Patent Application No. 2014-525169, a counterpart foreign application of U.S. Appl. No. 13/571,773, 9 pages.

Office action for U.S. Appl. No. 13/571,773, dated Jan. 6, 2016, Song et al., "Shrinking Virtual Hard Disk Image", 17 pages.

Final Office Action for U.S. Appl. No. 13/571,773, dated Apr. 9, 2015, Zhen-hua Song, "Shrinking Virtual Hard Disk Image", 13 pages.

Office action for U.S. Appl. No. 13/571,773, dated Sep. 15, 2014, Song et al., "Shrinking Virtual Hard Disk Image", 16 pages.

PCT Search Report dated Nov. 7, 2012 for PCT application No. PCT/US12/50296, 12 pages.

Chinese Office Action dated Aug. 14, 2015, for Chinese patent application No. 201110223833.2, a counterpart foreign application of U.S. Appl. No. 13/571,773, 7 Pages.

Office action for U.S. Appl. No. 13/571,773, dated Sep. 25, 2014, Song et al., "Shrinking Virtual Hard Disk Image", 16 pages.

Translated Japanese Office Action dated Sep. 26, 2017 for Japanese Patent Application No. 2017-022345, a counterpart foreign application of U.S. Pat. No. 9,501,225, 8 pages.

European Office Action dated Mar. 28, 2018 for European Patent Application No. 12748349.3, a counterpart foreign application of U.S. Pat. No. 9,501,225, 8 pages.

* cited by examiner

SHRINKING VIRTUAL HARD DISK IMAGE

CROSS REFERENCE TO RELATED PATENT APPLICATIONS

This application is a continuation of and claims priority to commonly assigned, co-pending U.S. patent application Ser. No. 13/571,773, filed Aug. 10, 2012, which claims foreign priority to Chinese Patent Application No. 201110228838.2 filed on Aug. 10, 2011, entitled "Method and Apparatus of Shrinking Virtual Hard Disk Image," which applications are hereby incorporated by reference in their entirety.

TECHNICAL FIELD

The present disclosure relates to the field of computer file processing technology and, more specifically, to a method and an apparatus of shrinking virtual hard disk image file.

BACKGROUND

An image file is similar to a zip file to some extent. The image file may include a set of files into a single file according to a certain format, which may be used for a test version of operation system, game, etc. One important characteristic of the image file is that it may be recognized by a specific software and may be directly burned to a disc. The image file may be extended such that there may be more information included in the image file including a system file, a boot file, partition information, etc. Thus, the image file may include all information of a partition or even a hard disk.

Virtual hard disk (VHD) is an image file format of a virtual hard disk. A file with VHD format may be used as the virtual hard disk to format and store data of a virtual machine.

There may be three types of VHD files including a fixed hard disk image file, a dynamic hard disk image file, and a differencing hard disk image file. The size of the fixed hard disk image file is fixed when it is created. The operations for the fixed hard disk image file, such as formatting the file system, writing data, or deleting data, may not change the size of the fixed hard disk image file. The sizes of the dynamic hard disk image file and the differencing hard disk image file may be increased when data is written therein. However, the sizes of the dynamic hard disk image file and the differencing hard disk image file is not reduced when data is deleted therein.

For example, when the dynamic hard disk image file is created with 2 GB of storage space, its initial size may be only be tens of KB. With data written into the dynamic hard disk image file, its size may increase to approximately 2 GB. However, deleting data in the dynamic hard disk image file does not reduce its size.

Based on such characteristics, once data is written into the dynamic hard disk image file or the differencing hard disk image file, its file size is increased. Even if the data is later deleted, the file size does not shrink. Thus, such deleted data still occupies the storage spaces of the VHD, thereby wasting storage spaces.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or computer-readable instructions as permitted by the context above and throughout the present disclosure. The present disclosure discloses a method and an apparatus of shrinking virtual hard disk image.

The present disclosure discloses a method of shrinking virtual hard disk image file. A file includes one or more data blocks and a block allocation table (BAT) that records information of each data block. One or more garbage data blocks are searched in the file and one or more records corresponding to the garbage data blocks in the BAT are revised. The garbage data block is a data block that does not store effective data. An effective data block subsequent to the garbage data block is moved to a position of the garbage data block, and a corresponding record of the effective data block in the BAT is revised after the effective data block is moved. After the movement of data blocks is completed, a size of the file is reduced.

For example, each data block may include one or more sectors and a bitmap that records information of each sector. Prior to a search of the garbage data block in the file, one or more garbage sectors in the data block are searched and corresponding records of the one or more garbage sectors in the bitmap are revised.

For example, the search of the garbage data block in the file may include a search of the bitmap of the data block of the file, and a determination that the data block whose bitmap shows that records of all corresponding sectors are garbage sectors is the garbage data block.

For example, the search of the garbage sectors in the data block may include a search of the bitmap in the data block of the file. If a record corresponding to a sector in the bitmap indicates that there is data stored in the sector, a determination as to the type of the file is made. If the file is a dynamic hard disk image file, a further determination is made whether all data in the sector are represented as 0. If a determination result is positive, the sector is determined as the garbage sector. If the file is a differencing hard disk image file, a further determination is made whether data stored in the sector is the same as data stored in a corresponding sector with the same sector location at a parent image file. If they are the same, the sector is determined to be the garbage sector.

As another example, the search of the garbage sectors in the data block may include following a process when a determination is made that the file is the dynamic hard disk image file. A source bitmap of the data block of the file and a block bitmap indicating whether a corresponding sector stores effective data are obtained. Every bit between the source bitmap and the block bitmap are compared. If a record of the corresponding sector in the source bitmap indicates that the sector stores data while the corresponding record of the sector in the block bitmap indicates that the sector does not store data, the sector is determined to be the garbage sector.

As another example, the search of the garbage sectors in the data block may include following a process when a determination is made that the file is the differencing hard disk image file. A source bitmap of the data block of the file, a block bitmap indicating whether a corresponding sector stores effective data, and a parent bitmap of the same data block in a parent image file are obtained. Every bit at the source bitmap, the block bitmap, and the parent bitmap are compared. If a record of the corresponding sector in the source bitmap indicates that the sector stores data while a corresponding record of the sector in the parent bitmap indicates that the sector does not store data and a corresponding record of the sector in the block bitmap indicates that the sector does not store data, the sector is determined to be the garbage sector.

For example, after the data blocks finish moving, the file is shrunk. After the data blocks are moved, the unused space whose size equivalent to the one or more garbage data blocks is formed at an end of the file. The unused space is deleted and a file with shrunken size is obtained.

The present disclosure also discloses an apparatus for shrinking virtual hard disk image file. A file includes data blocks and a BAT that records information of each data block. The apparatus may include a data block searching module, a data moving module, a file shrinking module. The data block searching module searches one or more garbage data blocks in the file and revises one or more records corresponding to the garbage data blocks in the BAT. The garbage data block is a data block that does not store effective data. The data moving module moves an effective data block subsequent to the garbage data block to a location of the garbage data block, and revises a corresponding record of the effective data block in the BAT after the effective data block is moved. The file shrinking module, after the movement of data blocks is completed, shrinks the size of the file.

For example, each data block may include one or more sectors and a bitmap that records information of each sector. The apparatus may further include a garbage sector searching module that searches one or more garbage sectors in the data block and reuses corresponding records of the one or more garbage sectors in the bitmap.

As another example, the garbage data block searching module may search the bitmap of the data block of the file, and determine that the data block whose bitmap shows that records of all corresponding sectors are garbage sectors as the garbage data block.

As yet another example, the garbage sector searching module may include a bitmap searching sub-module and a determination sub-module. The bitmap searching sub-module searches the bitmap in the data block of the file. If a record corresponding to a sector in the bitmap indicates that there is data stored in the sector, the determination sub-module is triggered. The determination sub-module determines a type of the file. If the file is a dynamic hard disk image file, the determination sub-module determines whether all data in the sector are represented as 0. If a determination result is positive, the sector is determined as the garbage sector. If the file is a differencing hard disk image file, the determination sub-module determines whether data stored in the sector is the same as data stored in a corresponding sector with the same sector location at a parent image file. If they are the same, the sector is determined to be the garbage sector.

As another example, if the file is the dynamic hard disk image file, the garbage sector searching module may include a first obtaining sub-module and a first comparison sub-module. The first obtain sub-module obtains a source bitmap of the data block of the file and a block bitmap indicating whether a corresponding sector stores effective data. The first comparison sub-module compares every bit between the source bitmap and the block bitmap. If a record of a corresponding sector in the source bitmap indicates that the sector stores data while a corresponding record of the sector in the block bitmap indicates that the sector does not store data, the sector is determined to be the garbage sector.

As another example, if the file is the differencing hard disk image file, the garbage sector searching module may include a second obtaining sub-module and a second comparison sub-module. The second obtaining sub-module obtains a source bitmap of the data block of the file, a block bitmap indicating whether a corresponding sector stores effective data, and a parent bitmap of the same data block in a parent image file. The second comparison sub-module compares every bit among the source bitmap, the block bitmap, and the parent bitmap. If a record of a corresponding sector in the source bitmap indicates that the sector stores data while a corresponding record of the sector in the parent bitmap of the parent image file indicates that the sector does not store data and a corresponding record of the sector in the block bitmap indicates that the sector does not store data, the sector is determined to be the garbage sector.

Compared with the conventional techniques, the present techniques in the present disclosure have at least following advantages.

First, the present techniques search the garbage data block in the virtual hard disk image file, move the effective data block after the garbage data block into the location of the garbage data block, and thus form the unused space at the end of the file. The present techniques then cut or delete the useless space and thus the garbage data lock in the file is cleaned and the size of the file is shrunk. The present techniques allow reducing the size of the dynamic disk image file or the differencing disk image file after some data therein are deleted, thereby saving the storage space of the file Second, the present techniques provide a method to quickly calculate garbage sectors that may quickly identify which sectors in the data block are the garbage sectors, and determine the data block whose sectors are all garbage sectors to be the garbage data block.

It is not necessary for any product of the present disclosure to have all of the above advantages.

BRIEF DESCRIPTION OF THE DRAWINGS

To better illustrate embodiments of the present disclosure, the following is a brief introduction of figures to be used in descriptions of the embodiments. It is apparent that the following figures only relate to some embodiments of the present disclosure. A person of ordinary skill in the art can obtain other figures according to the figures in the present disclosure without creative efforts.

DETAILED DESCRIPTION

The following is a detailed description of the present techniques by reference to the FIGs. The described embodiments herein are example embodiments and should not be used to restrict the scope of the present disclosure.

The techniques described in the present disclosure provide a method of cleaning garbage data in a virtual hard disk image file and reducing a size of the file. After some data in the image file is deleted, the present techniques may reduce the size of the file, thereby saving a storage space of the file. The following describes an example method of the present disclosure by using an example of an image file in virtual hard disk (VHD) format.

Figure 1:
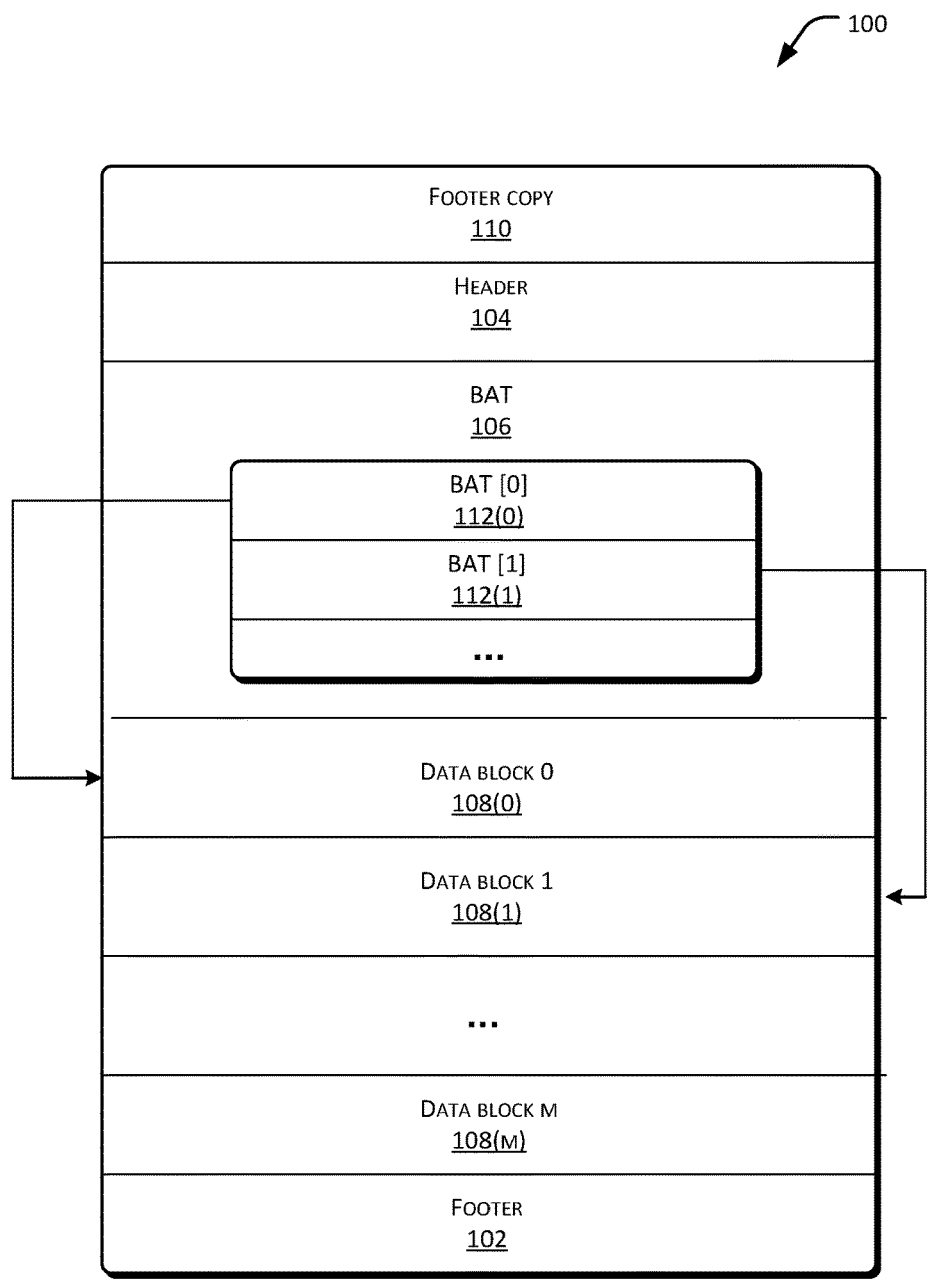
FIG. 1 illustrates a diagram of an example VHD image file format in accordance with the present disclosure.

FIG. 1 illustrates a diagram of an example VHD image file format 100 in accordance with the present disclosure. The example VHD image file 100 includes a footer 102, a header 104, a BAT (BAT) 106, and one or more data blocks 108(0), 108(1), . . . , 108(m), where m may be any integer.

The footer 102 records information such as a starting sector of the header 104, a file size, a type of image (such as dynamic image or differencing image), etc. The footer 102 is at the end of the file 100. When there is new data written into the file 100, it is moved afterwards to the end of the file 100. As the footer 102 contains important information of the file 100, a footer copy 110 may be also saved at the beginning of the file 100.

The header 104 records information such as a starting sector of the BAT 106, a number of items in the BAT 106 (that is, an allowed maximum number of data blocks), sizes of the data blocks 108, etc. In addition, if the file is a differencing image file, the header 104 also records location information of its parent image or a parent image file.

Each BAT item 112 in the BAT 106, such as BAT[0] 112(0) and BAT[1] 112(1), corresponds to a starting sector of a respective data block 108. For example, the BAT[0] 112(0) corresponds to the data block 0 108(0) and the BAT[1] 112(1) corresponds to the data block 1 108(1). If a record in the BAT does not have corresponding data block 108, the record may include 0xFFFFFFFF representing an unassigned data block.

Each data block 108 includes a bitmap and one or more data fields (or sectors). In a dynamic VHD file, if a bit in the bitmap is 0, it represents that a sector corresponding to the bit does not store data. If the bit in the bitmap is 1, it represents that the sector corresponding to the bit stores data. However, if data in the sector is deleted, the bit is not reversed and still shows 1. In other words, when data in one sector is allocated from the data block 108 to the file 100, if the data is not revised, the corresponding bit in the bit map is 0; if the data is revised, the corresponding bit in the bit map is 1.

In a differencing VHD file, if a bit is 1, it represents that a corresponding sector of the differencing VHD file stores effective data. If the bit is 0, it represents that the corresponding sector of the differencing VHD file does not store effective data and data needs to be read from a corresponding sector at a parent image file. If the parent image file is also a differencing image file, data needs to be read from the parent image file's parent image file until a non-differencing ancestor image file (which is fixed or dynamic) is found.

The data blocks in the image file 100 may have the same size, which is recorded in the header 104.

Based on the image file format 100 as shown in FIG. 1, when the dynamic image file or the differencing image file is created, the newly created image file may only include sections including the footer, the header, the BAT, etc. The data blocks are not allocated. When data is written into the image file, one or more data blocks are allocated to the data to save the data, and the corresponding records in the BAT are updated to record the starting sector of the data blocks.

When stored data is read from the VHD image file, a logical sector number (which corresponds to the logical sector number that stores the data instead of the physical sector number relative to the VHD image file) to be read is converted to the physical sector number relative to the VHD image file. One example conversion method is as follows:

BlockNumber=LogicalSectorNumber/SectorsPerBlock, where symbol "/" represents a division operator. For example, 5/3=1.

SectorInBlock=LogicalSectorNumber % SectorsPerBlock, where symbol "%" represents a modulus operator. For example, 5%3=2.

PhysicalSectorLocation=BAT[BlockNumber]+BlockBitmapSectorCount+SectorInBlock, where:

LogicalSectorNumber represents a logical sector number;

BlockNumber represents a data block number;

SectorsPerBlock represents a number of sectors in a data block

SectorInBlock represents a number of sector in its located data block;

PhysicalSectorLocation represents a physical sector number relative to the VHD image file; and BlockBitmapSectorCount represents a number of sectors in the bitmap.

From the perspective of a virtual machine user, the VHD image file acts like a disk partition and can deploy a file system thereon. When there is data that needs to be written, based on different data writing strategies for different file systems, the data may be written into different physical locations of the file system. In an example, the data may not be written in a sequence that starts from the starting location of the file system and then one-by-one afterwards (that is, starting from a small sector number to a large sector number relative to the starting location). Thus, in the VHD file, the sequences of the data blocks are often different from the sequence of their starting section numbers.

In the example of FIG. 1, for example, the size of each data block 108 may be 2 MB. If the virtual machine user intends to write data with several KBs at the 3 MBth location, the file system may firstly allocate the data block 1 108(1) instead of the data block 0 108(0) to the VHD file.

Figure 2:
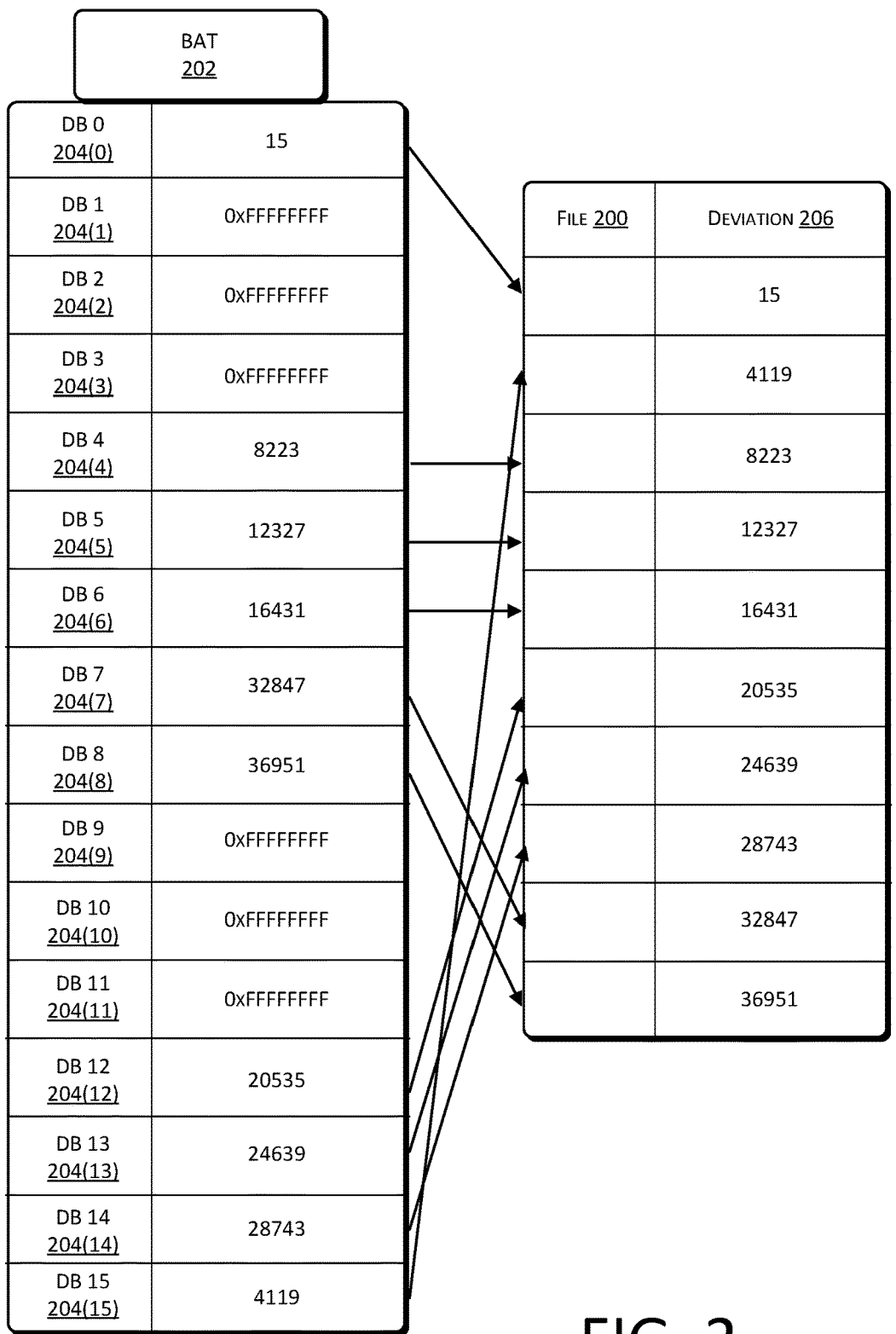
FIG. 2 illustrates a diagram of an example block allocation table (BAT) in accordance with the present disclosure.

FIG. 2 illustrates an example BAT 202 in accordance with the present disclosure. In the example of FIG. 2, a VHD file 200 may have 16 data blocks. A BAT 202 records a number of the 16 data blocks (which is abbreviated as DB) 204 at a certain time, which are DB 0 204(0), DB 1 204(1), DB 2 204(2), DB 3 204(3), DB 4 204(4), DB 5 204(5), DB 6 204(6), DB 7 204(7), DB 8 204(8), DB 9 204(9), DB 10 204(10), DB 11 204(11), DB 12 204(12), DB 13 204(13), DB 14 204(14), DB 15 204(15). The BAT 202 also records a starting sector of each data block 204.

A starting sector number of a respective data block is a relative position of the respective data block in the VHD file. A deviation 206 indicates a relative position of the respective data block in the file 200.

When the starting sector number of the respective data block is 0xFFFFFFFF, it indicates that the respective data block has not been assigned. In the example of FIG. 2, the starting sector number of DB 0 204(0) is 15 and it corresponds to a value of 15 at deviation 206. The starting sector numbers of DB 1 204(1), DB 2 204(2), DB 3 204(3), DB 9 204(9), DB 10 204(10), and DB 11 204 (11) are 0xFFFFFFFF. The starting sector number of DB 0 204(0) is 15 and it corresponds to a value of 15 at deviation 206. The starting sector number of DB 4 204(4) is 8223 and it corresponds to a value of 8223 at deviation 206. The starting sector number of DB 5 204(5) is 12327 and it corresponds to a value of 12327 at deviation 206. The starting sector number of DB 6 204(6) is 16431 and it corresponds to a value of 16431 at deviation 206. The starting sector number of DB 7 204(7) is 32847 and it corresponds to a value of 32847 at deviation 206. The starting sector number of DB 8 204(8) is 36951 and it corresponds to a value of 36951 at deviation 206. The starting sector number of DB 12 204(12) is 20535 and it corresponds to a value of 20535 at deviation 206. The starting sector number of DB 13 204(13) is 24639 and it corresponds to a value of 24639 at deviation 206. The starting sector number of DB 14 204(14) is 28743 and it corresponds to a value of 28743 at deviation 206. The starting sector number of DB 15 204(15) is 4119 and it corresponds to a value of 4119 at deviation 206. As shown in FIG. 2, the starting sector number of each data block 204 does not go from a small number to a big number according to the sequence from DB 0 204(0) to DB 15 204(15).

Based on the above description, the following is an analysis showing that the conventional techniques cannot shrink the VHD file even if data is deleted from the VHD file.

Under the conventional techniques, when a data block corresponding to a sector to which data is to be written has not been assigned (that is, the corresponding item record in the BAT is 0xFFFFFFFF), a new data block is assigned (a corresponding item record in the BAT is a new starting section number of the newly assigned data block), and a bit in the bitmap corresponding to the sector to which the data is to be written is revised as 1. However, after some data is deleted, even if the data in the data block is not effective or valid, a bit of the data block in the bitmap is not reversed, and still remains as 1, which represents that the data block is assigned. Thus, the conventional techniques cannot collect the storage space occupied by the data block, thereby causing the storage space to be wasted.

Based on the above description, to save the storage space of the VHD file, the VHD file should be shrunken. Before the file is shrunk, data stored at subsequent locations in the data file is moved to the position where the garbage data is located, and the unused space is thus formed at the end of the file. The unused space is then cut or deleted.

Thus, the present disclosure provides a method of shrinking virtual hard disk image file to effectively eliminate garbage data in the file and shrink the file.

Figure 3:
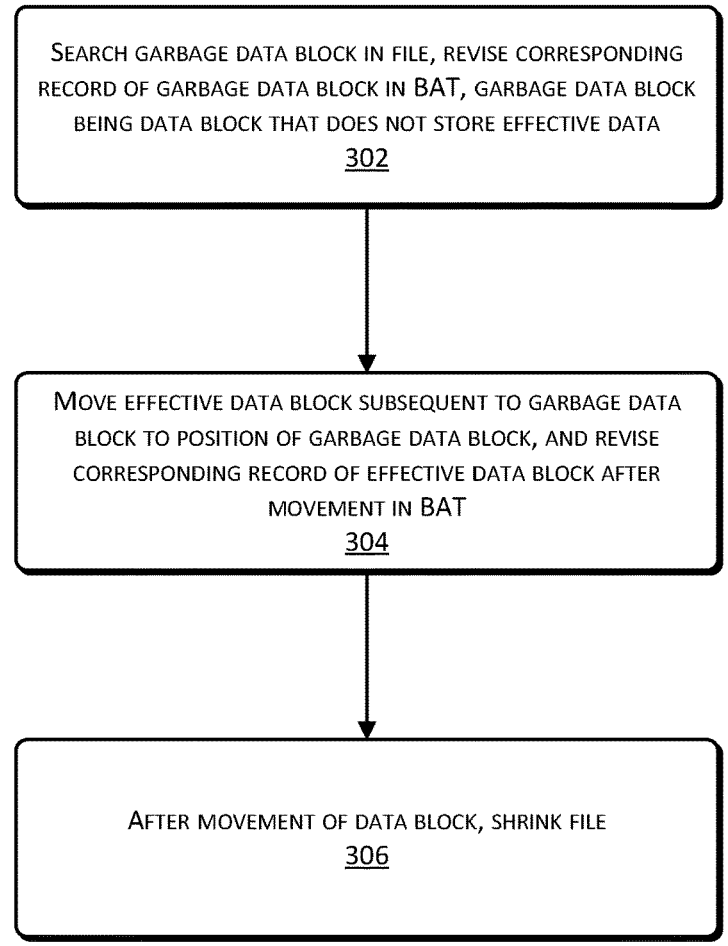
FIG. 3 illustrates a flowchart of an example method of shrinking a virtual hard disk image file in accordance with the present disclosure.

FIG. 3 illustrates a flowchart of an example method of shrinking a virtual hard disk image file in accordance with the present disclosure. At 302, a garbage data block in a file is searched and a corresponding record of the garbage data block in a BAT is revised. The garbage data block is a data block that does not store effective data.

The data block in the file may be mainly classified either as the garbage data lock or an effective data block. The effective data block is a data block that stores effective data. The garbage data block refers to a data block in which data is all deleted. That is, data in the garbage data block is not effective.

After the garbage data block is found, a value of a starting section number of the garbage data block in the BAT is set as 0xFFFFFFFF. That is, a logical data block corresponding to the data block does not store data.

At 304, the effective data block having a subsequent position to the garbage data block is moved to the position of the garbage data block, and a corresponding record of the effective data block after the movement in the BAT is revised.

The subsequent position, in a physical storage space of the file, refers to the effective data block that has a position in the file after the position of the garbage data block is moved to the position of the garbage data block. The starting section number of the effective data block in the BAT is revised to the starting section number of the garbage data block.

The movement refers to a replicating process. The data in the effective data block having a subsequent position to the garbage data block is copied to the position of the garbage data block.

At 306, after the data block finishes the movement, the file is shrunk. The purpose of the movement is to move the effective data block to a front of the file to an extent such that useless space is formed at the end of the file. The useless space is then cut or deleted. Thus, the size of the file is shrunk.

Figure 4:
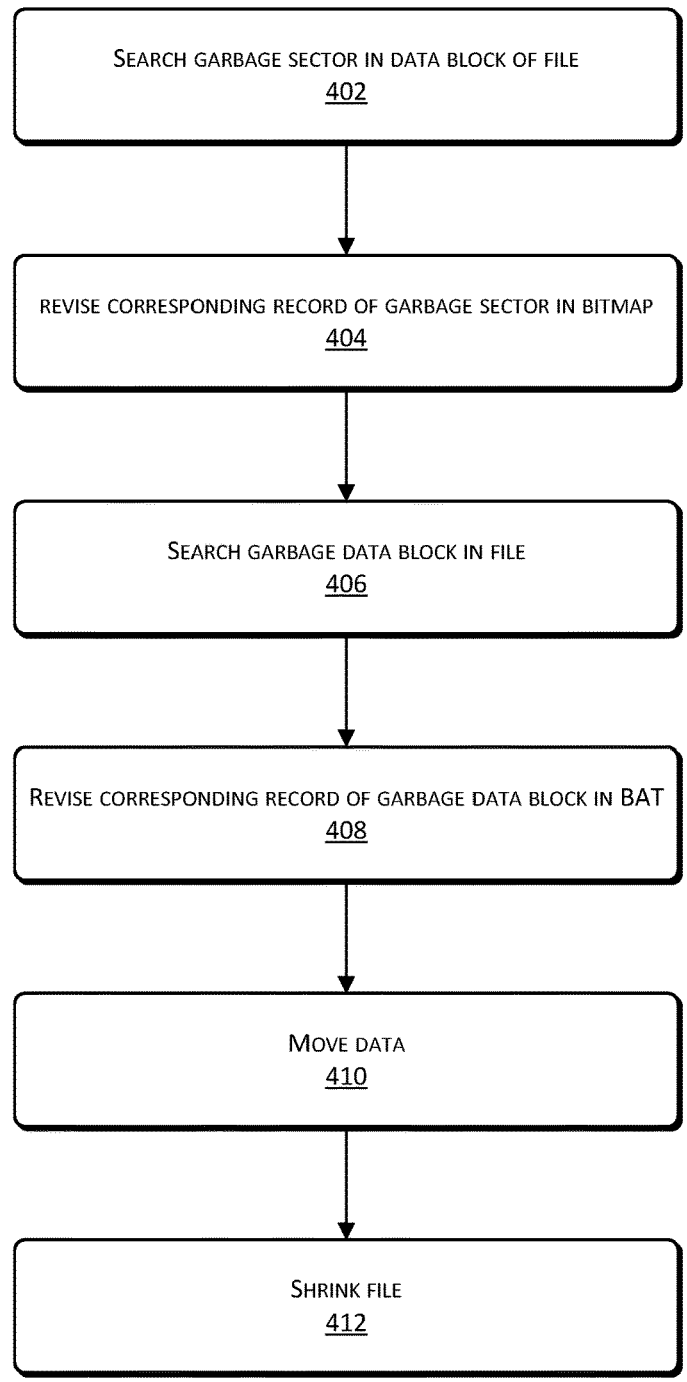
FIG. 4 illustrates a flowchart of another example method of shrinking a virtual hard disk image file in accordance with the present disclosure.

To enable a person of ordinary skill to better understand the example embodiment as shown in FIG. 3, FIG. 4 illustrates a flowchart of another example method of shrinking a virtual hard disk image file in accordance with the present disclosure. FIG. 4 still uses a VHD file as the example.

At 402, a garbage data sector in the file is searched. For example, with respect to each sector in each data block, a bitmap of the data block is searched. If a record corresponding to a sector in the bitmap indicates that there is data stored in the sector, such that a bit corresponding to the sector in the sector map is 1, data is stored in the corresponding sector or the data has already been deleted from the sector. One or more further determinations need to be made.

If the file is the dynamic hard disk image file, it is determined whether the data stored in the sector are all 0s. If the data stored in the sector are all 0s, the sector is determined to be the garbage sector.

If the file is the differencing hard disk image file, it is determined whether the data stored in the sector is the same as data stored at the same sector location in a parent image file. If the data stored in the sector is the same as data stored at the same sector location in the parent image file, the sector is determined to be the garbage sector.

At 404, a corresponding record of the garbage sector in a bitmap is revised. After the garbage sector is found, the bit corresponding to the garbage sector in the bitmap is cleared to 0, which represents that there is no data store in the sector.

At 406, a garbage data block in the file is searched. For example, the bitmap of the data block in the file is searched. If records of all sectors of the data block in the bitmap are indicated as garbage sectors, the data block is determined as the garbage data block. For each data block, if the data block is used (such that the corresponding record in the BAT is not 0xFFFFFFFF), however, after the above operations, the bit map of the data block shows all 0 and the data block is also determined to be the garbage data block as it no longer stores effective data.

However, in the bitmap of the data block, if some bits corresponding to the sectors are 0 and some bits corresponding to the sectors are 1, the data block is not the garbage data block and is still the effective data block.

Figure 5:
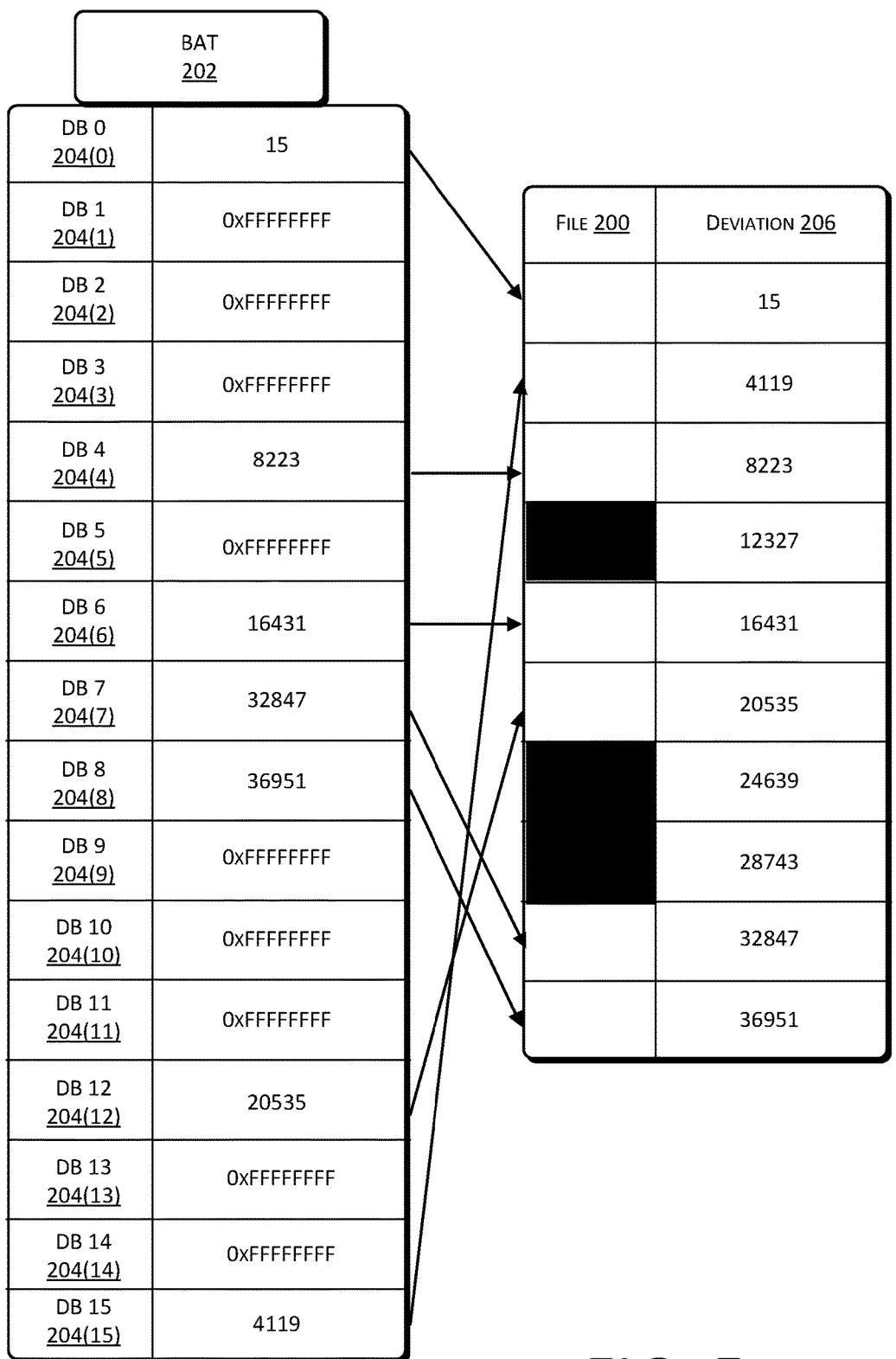
FIG. 5 illustrates a diagram of the example BAT after a search of garbage data block in accordance with the example embodiment as shown in FIG. 2.

At 408, a corresponding record of the garbage data block in the BAT is revised. In the BAT, the record of the starting sector of the garbage data block is set as 0xFFFFFFFF. For example, in the example of FIG. 2, the starting sector numbers of the three data blocks DB5 204(5), DB 13 204(13), and DB 14 204(14) are 12327, 24630, and 28743 respectively. After the above three operations, it is determined that the three data blocks are garbage data blocks. Their corresponding records in the BAT, i.e. DB 5 204(5), DB 13 204(13), and DB 14 204(14), are set as 0xFFFFFFFF as shown in FIG. 5. FIG. 5 illustrates a diagram of the example BAT 202 after a search of garbage data block in accordance with the example embodiment as shown in FIG. 2.

In the example of FIG. 5, the three data block whose starting sector numbers newly set as 0xFFFFFFFF are mark as black to indicate that these three blocks are now garbage data blocks.

At 410, data is moved. The effective data block (source position) subsequent to the garbage data block (target position), including its bitmap and data, is copied to the position of the garbage data block. The starting sector of the effective data block in the BAT after the movement is updated.

Figure 6:
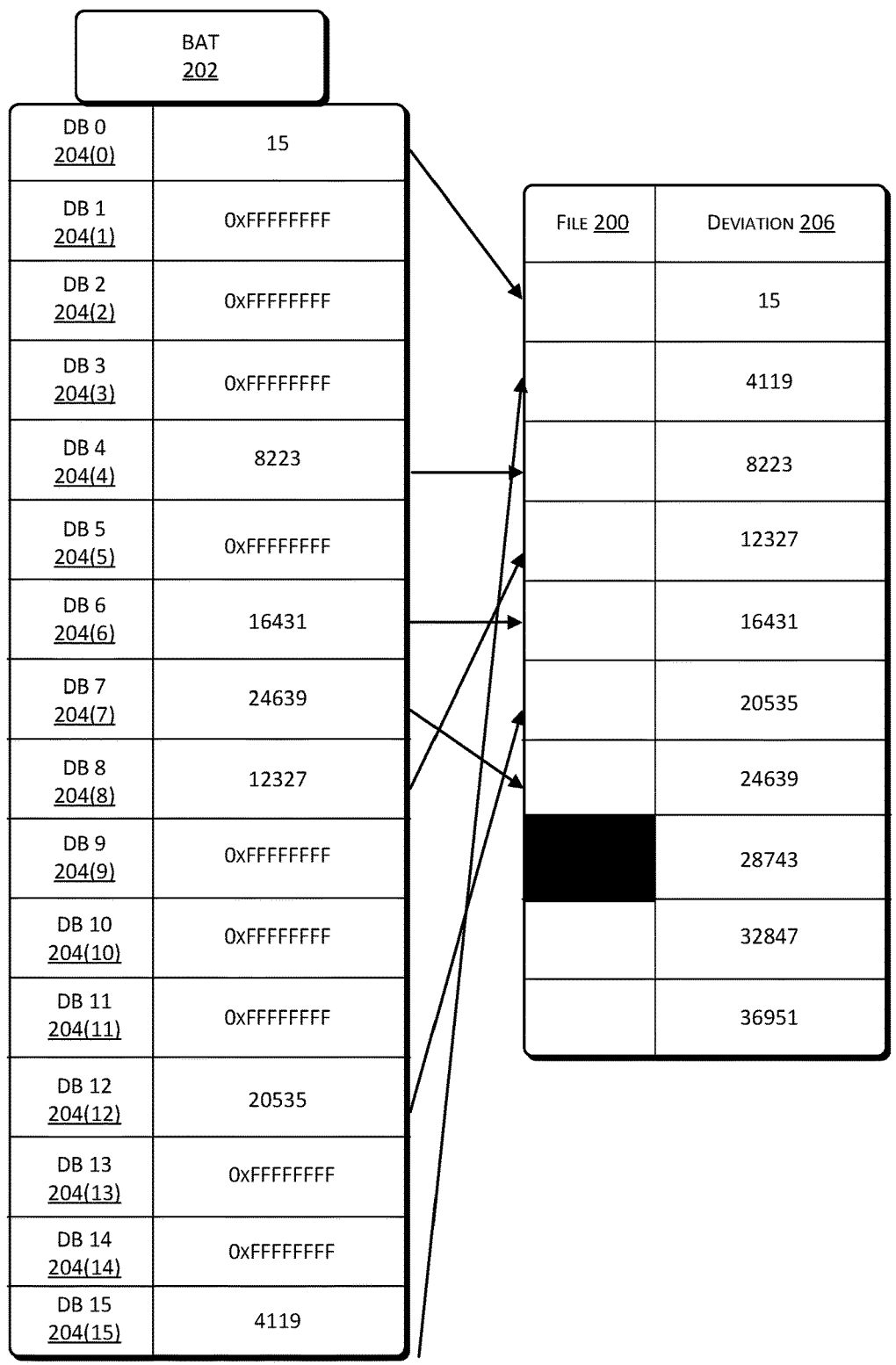
FIG. 6 illustrates a diagram of the example BAT after data is moved in accordance with the example embodiment as shown in FIG. 5.

For example, in FIG. 5, the effective data block DB 8 204(8) with the starting sector number 36951 may be moved to the data block with the starting sector number 12327. The starting sector number of the corresponding BAT[8] is changed to 12327. The effective data block DB 7 204(7) with the starting sector 32847 may be moved to the data block with the starting sector 24639. The starting sector number of the corresponding BAT[7] is changed to 24639. Finally, a file as shown in FIG. 6 is formed. FIG. 6 illustrates the diagram of the example BAT 202 after data is moved in accordance with the example embodiment as shown in FIG. 5.

Thus, at the end of the file 200, the data block with the starting sector 28743 is still the garbage data block while data in the data blocks whose starting sectors are 32847 and 36951 are copied to the data blocks whose starting sectors are changed to 24639 and 12327 respectively. Thus, the data blocks whose starting sectors are 32847 and 36951 no longer need to be reserved for the file 200. The total three data blocks with the starting numbers 28743, 32847, and 36951 respectively form unused space.

There may be other moving techniques with a purpose to form the unused space at the end of the file for a convenience to shrink the file.

Figure 7:
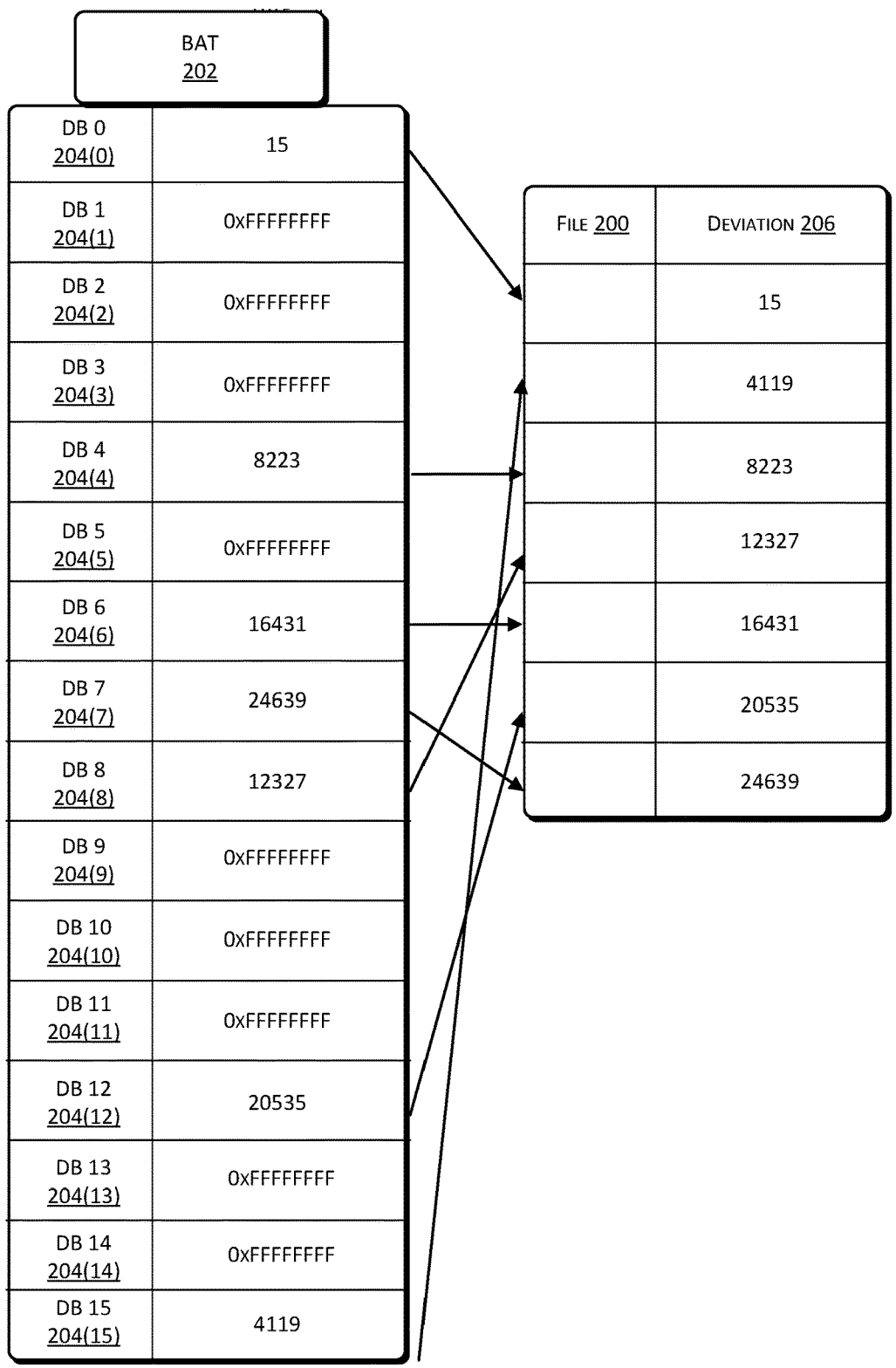
FIG. 7 illustrates a diagram of the example BAT after the file is shrunk in accordance with the example embodiment as shown in FIG. 6.

At 412, the file is shrunk. For example, after the movements of the data blocks are completed, that is the garbage data blocks found at 406 store the effective data now or no more effective data blocks may be copied to the positions of the garbage data blocks, the unused space is thus formed at the end of the file 200. After the unused space is cut or deleted, the shrunken file is obtained. For example, a maximum of the shrunken size may be the size of the found garbage data blocks. As shown in FIG. 7, the three blocks at the end of the file are cut or deleted.

The present techniques clean the garbage data and shrink the storage space of the dynamic hard disk image file or the differencing hard disk image file in VHD format after some data therein are deleted, thereby saving the storage space of the file.

In the process of searching the garbage data blocks, in addition to using the above described methods to read the bitmap from the current image file (if the file is the dynamic image file) and/or the parent image file (if the differencing image file) for comparison to determine whether the sector is the garbage sector, the present techniques also provide a method for quicklycalculating garbage sectors. This method may quickly identify garbage sectors from the data blocks and treat the data blocks whose all sectors are garbage sectors as the garbage data blocks.

The following example method of quickly calculating garbage sectors still uses the example of the VHD image file.

With respect to the differencing hard disk image file, for each data block, three bitmaps may be obtained, which are a source bitmap which may be represented as src_bmp, a parent bitmap which may be represted as prt_bmp, and a block bitmap, which may be represented as blk_bmp.

The src_bmp represents a source bitmap of the data block in the VHD image file. The prt_bmp represents an ancestor image's bitmap. For example, a parent bitmap of the data block in a parent image file is read. If a bit in the parent bitmap of the data block in the parent image file is 1, then the bit is 1. Otherwise, the bitmap of the data block is read from the parent image file's parent image file until a final ancestor's image file. If the bit in the bitmap in the final ancestor's image file is 0, then the bit is 0.

The blk_bmp represents a block bitmap. For example, the virtual machine user may read the file system established in the VHD image file and reflectively obtain the bitmap, which represents whether the sector stores effective information.

The file system generally records the bitmap information of data by various methods to identify which sectors store the effective information and which sectors do not store the effective information. For example, ext2/3/4 is frequently used in Linux®. The bitmap block records which block stores the effective data. As another example, New Technology File System (NTFS) is often used in Windows®. Its $Bitmap file records the bitmap information of the blocks. One block may include several sectors.

After the bitmap information of the file system is obtained, the above described conversion method between the logical sector number and the physical sector number may be used to identify which sectors in the VHD file store the effective information, thereby the blk_bmp is obtained.

Then, the three bitmaps are compared with each other to generate a final destination bitmap, which may be represented as dst_bmp. The dst_map may be used as the bitmap of the data block in the VHD after bits corresponding to the garbage sectors in the bitmap are cleared to 0 (that is, after complete of operations at 404). For each bit, the following example method may be used, which are represented by pseudocodes:

```
if src_bmp = 0, then dst_bmp = 0;
if src_bmp = 1, then
    if prt_bmp = 0 and blk_bmp = 1, then dst_bmp = 1;
    /* It represents that relative to the parent image file, new data is
    written. */
    if prt_bmp = 1 and blk_bmp = 0, then dst_bmp = 1;
    /* It represents that relative to the parent image file, data is deleted */
    if prt_bmp = 0 and blk_bmp = 0, then dst_bmp = 0;
    /* It represents that relative to the parent image file, new data is
    written and such new
data is later deleted.*/
    if prt_bmp = 1 and blk_bmp = 1
    /* It represents that relative to the parent image file, a modification of
    data occurs. Data
is read from the source image file and the parent image file and
compared. If they are the same,
dst_bmp is set as 0. Otherwise, dst_bmp is set as 1.*/
```

Based on the above method, if the record corresponding to the sector in the source bitmap indicates that the sector stores data (src_bmp=1), a corresponding record of the sector in the parent bitmap indicates that the sector does not store data (prt_bmp=0), and a corresponding record of the sector in the block bitmap indicates that the sector does not store data (blk_bmp=0), the sector is determined as the garbage sector.

In addition, when src_bmp=1, prt_bmp=1, and blk_bmp=1, data is extracted from the source image and the parent image to be compared. If they are the same, dst_bmp is set as 0. The sector is also determined as the garbage sector.

The processing for the dynamic hard disk image is relatively simple. For example, at first, for each data block, the source bitmap and the block bitmap are obtained. There is no need to obtain the parent bitmap.

Then the source bitmap and the block bitmap are compared to obtain the destination bitmap or dst_bmp as the sector bitmap in the above operations after 404. For each bit, the following example method may be used, which are represented by pseudocodes:

```
if src_bmp = 0, then dst_bmp = 0;
if src_bmp = 1, then
if blk_bmp = 1, then dst_bmp = 1;
/* It represents that new data is written.*/
if blk_bmp = 0, then dst_bmp = 0;
/*It represents that new data is written. However, the newly written
data is later
deleted. */
```

As shown above, if the record corresponding to the sector in the source bitmap indicates that the sector stores data (src_bmp=1), and a corresponding record of the sector in the block bitmap indicates that the sector does not store data (blk_bmp=0), the sector is determined as the garbage sector.

The above example embodiments are illustrated by using the image file in VHD format as the example. The present techniques may also be used in the virtual image file in other kinds of formats with same or similar principles as described above, which are not detailed herein.

For brevity, the above example method embodiments are illustrated as a combination of a series of operations. One of ordinary skill would appreciate that the present disclosure shall not be limited with the sequence of described operations herein. The operations described herein may take other sequences or happen concurrently according to the present disclosure. One of ordinary skill would also appreciate that the embodiments described herein are for illustration purpose and not all operations are necessary in accordance with the present disclosure.

Based on the illustration of the above example method embodiments, the present disclosure also provides a corresponding apparatus of shrinking virtual hard disk image file to implement the above example methods.

Figure 8:
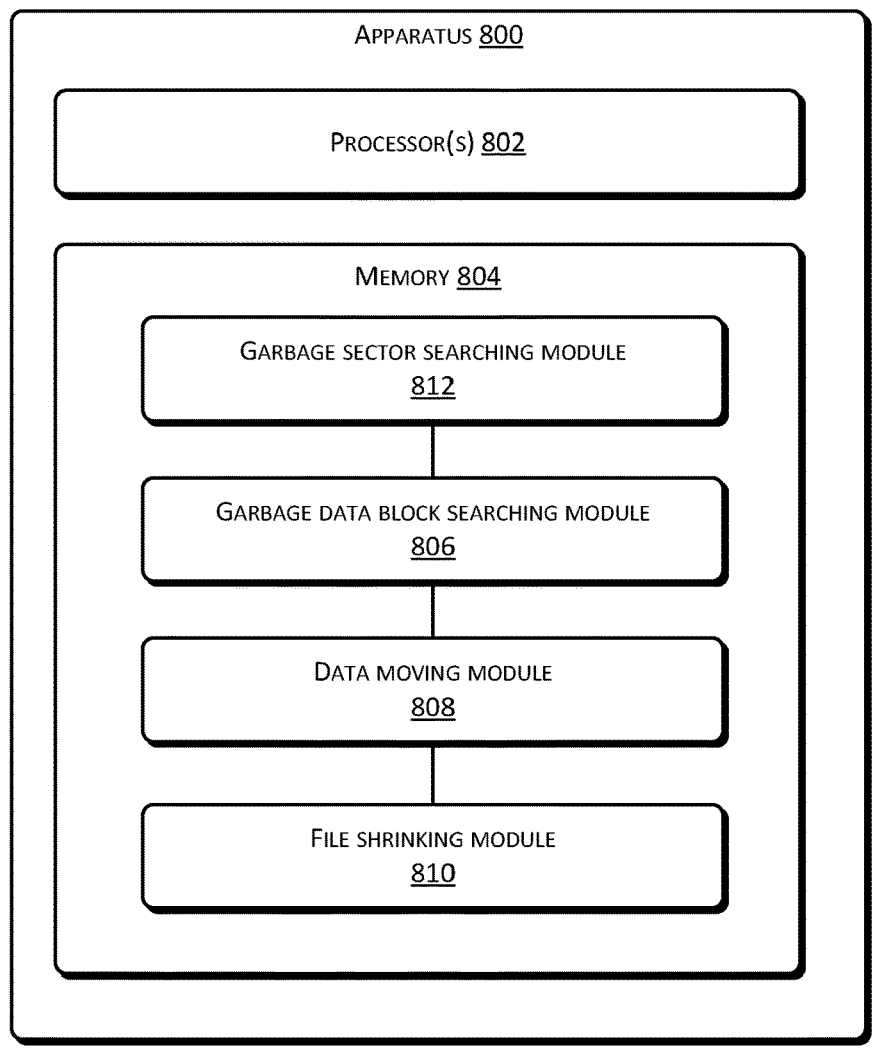
FIG. 8 illustrates an example apparatus of shrinking virtual hard disk image file in accordance with the present disclosure.

FIG. 8 illustrates a diagram of an example apparatus of shrinking virtual hard disk image file in accordance with the present disclosure.

The apparatus 800 may include, but is not limited to, one or more processors 802 and memory 804. The memory 804 may include computer storage media in the form of volatile memory, such as random-access memory (RAM) and/or non-volatile memory, such as read only memory (ROM) or flash RAM. The memory 704 is an example of computer storage media.

Computer storage media includes volatile and non-volatile, removable and non-removable media implemented in any method or technology for storage of information such as computer-executable instructions, data structures, program modules, or other data. Examples of computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include transitory media such as modulated data signals and carrier waves.

The memory 804 may store therein program units or modules and program data. In one embodiment, the modules may include a garbage data block searching module 806, a data moving module 808, and a file shrinking module 810.

The garbage data block searching module 806 searches one or more garbage data blocks in the file and revises one or more records corresponding to the garbage data blocks in the BAT. The garbage data block is a data block that does not store effective data. The data moving module 808 moves an effective data block subsequent to the garbage data block to a position of the garbage data block, and revises a corresponding record of the effective data block in the BAT after the effective data block is moved. The filing shrinking module 810, after the movement of data blocks is complemented, shrinks the file.

For example, each data block may include one or more sectors and a bitmap that records information of each sector. The apparatus may further include a garbage sector searching module 812 that searches one or more garbage sectors in the data block and revises corresponding records of the one or more garbage sectors in the bitmap.

For example, based on the garbage sector searching module 812, the garbage data block searching module 806 may search the bitmap of the data block of the file, and determine that the data block whose bitmap shows that records of all corresponding sectors are garbage sectors as the garbage data block.

For example, the garbage sector searching module 812 may use two example methods to search the garbage sectors. In one example method, the garbage sector searching module 812 may read the bitmap from the source image (when the image file is the dynamic image file) or the parent image file (when the image file is the differencing image file) and compare them to determine whether the sector is the garbage sector. The garbage sector searching module 812 may include a bitmap searching sub-module and a determination sub-module. The bitmap searching sub-module searches the bitmap in the data block of the file. If a record corresponding to the sector in the bitmap indicates that there is data stored in the sector, the determination sub-module is triggered. The determination sub-module may conduct follow-up determination operations. The determination sub-module determines a type of the file. If the file is a dynamic hard disk image file, the determination sub-module determines whether all data in the sector are represented as 0. If a determination result is positive, the sector is determined as the garbage sector. If the file is a differencing hard disk image file, the determination sub-module determines whether data stored in the sector is the same as data stored in a corresponding sector with the same sector location at a parent image file. If they are the same, the sector is determined as the garbage sector.

For another example method of fast searching garbage sectors, the garbage sector searching module 812 may include different sub-modules bases on the type of the file. If the file is the dynamic hard disk image file, the garbage sector searching module 812 may include a first obtaining sub-module and a first comparison sub-module. The first obtain sub-module obtains a source bitmap of the data block of the file and a block bitmap that indicates whether the corresponding sector stores effective data. The first comparison sub-module compares every bit between the source bitmap and the block bitmap. If a record of a corresponding sector in the source bitmap indicates that the sector stores data while a corresponding record of the sector in the block bitmap indicates that the sector does not store data, the sector is determined as the garbage sector.

If the file is the differencing hard disk image file, the garbage sector searching module 812 may include a second obtaining sub-module and a second comparison sub-module. The second obtaining sub-module obtains a source bitmap of the data block of the file, a block bitmap indicating whether a corresponding sector stores effective data, and a parent bitmap of the same data block in the ancestor image file. The second comparison sub-module compares every bit among the source bitmap, the block bitmap, and the parent bitmap. If a record of a corresponding sector in the source bitmap indicates that the sector stores data while a corresponding record of the sector in the parent bitmap indicates that the sector does not store data and a corresponding record of the sector in the block bitmap indicates that the sector does not store data, the sector is determined to be the garbage sector.

The apparatus 800 of shrinking virtual hard disk image file as described in the present disclosure may reduce the size of the image file after data is deleted from the dynamic hard disk image file or the differencing hard disk image file in VHD format, thereby saving storage space of the file.

The above example embodiments of the apparatus of shrinking virtual hard disk image file are illustrated relatively simple as the principles are similar to those described in the example method embodiments. The relevant illustrations may refer to the example embodiments as shown in FIGS. 1-7.

The present disclosure is described by referring to the flow charts and/or block diagrams of the method, device (system) and computer program of the embodiments of the present disclosure. It should be understood that each flow and/or block and the combination of the flow and/or block of the flowchart and/or block diagram can be implemented by computer program instructions. These computer program instructions can be provided to the general computers, specific computers, embedded processor or other programmable data processors to generate a machine, so that a device of implementing one or more flows of the flow chart and/or one or more blocks of the block diagram can be generated through the instructions operated by a computer or other programmable data processors.

These computer program instructions can also be stored in other computer-readable storage which can instruct a computer or other programmable data processors to operate in a certain way, so that the instructions stored in the computer-readable storage generate a product containing the instruction device, wherein the instruction device implements the functions specified in one or more flows of the flow chart and/or one or more blocks of the block diagram.

These computer program instructions can also be loaded in a computer or other programmable data processors, so that the computer or other programmable data processors can operate a series of operation steps to generate the process implemented by a computer. Accordingly, the instructions operated in the computer or other programmable data processors can provides the steps for implementing the functions specified in one or more flows of the flow chart and/or one or more blocks of the block diagram.

The embodiments are merely for illustrating the present disclosure and are not intended to limit the scope of the present disclosure. It should be understood for one of ordinary skill in the technical field that certain modifications and improvements can be made and should be considered under the protection of the present disclosure without departing from the principles of the present disclosure.

What is claimed is:

1. A method performed by one or more processors configured with computer-executable instructions, the method comprising:
    searching, among one or more data blocks, for a garbage data block in an image file, the image file including the one or more data blocks and a block allocation table (BAT) that records information of each data block, the garbage data block not storing effective data, and the image file including a set of files into a single file according to a certain format;
    revising a record of the garbage data block in the BAT to indicate that there is no effective data stored in the garbage data block;
    moving an effective data block from a position located subsequent to the garbage data block to a position of the garbage data block, the position located subsequent to the garbage data block being nearer to an end of the image file than the position of the garbage data block;
    revising a record of a new location of the effective data block in the BAT after the moving; and
    shrinking a size of the image file after the moving.

2. The method as recited in claim 1, wherein each of the one or more data blocks includes:
    one or more sectors, and
    a bitmap that records information of each sector.

3. The method as recited in claim 2, further comprising, prior to searching for the garbage data block:
    searching for a particular sector, which is a garbage sector in the garbage data block; and
    revising a record of the garbage sector in a particular bitmap, which is the bitmap associated with the garbage data block.

4. The method as recited in claim 3, wherein the searching for the particular sector, which is the garbage sector in the garbage data block comprises:
    searching for the bitmap associated with the garbage data block;
    in response to a determination that a record corresponding to the particular sector in the bitmap associated with the garbage data block indicates that the particular sector stores data, determining a type of the image file,
    wherein, when the type of the image file is determined to be a dynamic hard disk image file, the searching for the particular sector further comprises: determining that the particular sector in the particular bitmap is the garbage sector if data stored in the particular sector is not effective data, and
    wherein, when the type of the image file is determined to be a differencing hard disk image file, the searching for the particular sector further comprises: determining that the particular sector in the particular bitmap is the garbage sector if data stored in the particular sector is the same as data stored in a corresponding sector with a same section location in a parent image file.

5. The method as recited in claim 4, wherein the determining that the particular sector is the garbage sector if data stored in the particular sector is not effective data comprises determining that data stored in the particular sector are all 0.

6. The method as recited in claim 3, wherein the searching for the particular sector, which is the garbage sector in the garbage data block comprises:
   determining that the image file is a dynamic hard disk image file;
   obtaining:
      a source bitmap of a data block being searched, and
      a block bitmap of the data block being searched, which block bitmap indicates whether a corresponding particular sector stores effective data; and
   comparing each bit between the source bitmap and the block bitmap,
   wherein, when a record of the particular sector in the source bitmap indicates that the particular sector stores effective data and a record of the corresponding particular sector in the block bitmap indicates that the corresponding particular sector does not store effective data, the searching for the particular sector further comprises: determining that the particular sector is the garbage sector.

7. The method as recited in claim 3, wherein the searching the garbage sector in the garbage data block comprises:
   determining that the image file is a differencing hard disk image file;
   obtaining:
      a source bitmap of a data block being searched,
      a block bitmap of the data block being searched, which block bitmap indicates whether the first corresponding particular sector stores effective data, and
      a parent bitmap of the data block being searched in a parent image file; and
   comparing each bit between the source bitmap, the block bitmap, and the parent bitmap,
   wherein, when a record of the particular sector in the source bitmap indicates that the particular sector stores effective data, a record of the first corresponding particular sector in the block bitmap indicates that the first corresponding particular sector does not store effective data, and a record of a second corresponding particular sector in the parent bitmap indicates that the second corresponding particular sector does not store effective data, the searching for the particular sector further comprises: determining that the particular sector is the garbage sector.

8. The method as recited in claim 7, further comprising determining whether the record of the second corresponding particular sector in the parent bitmap does not store the effective data, including: reading a parent bitmap from the parent image file to a final ancestor image file,
   wherein, when a bit corresponding to the second corresponding particular sector in any parent bitmap of the data block being searched indicates that the second corresponding particular sector stores the effective data, the determining whether the record of the second corresponding particular sector in the parent bitmap does not store the effective data further includes determining that the second corresponding particular sector in the parent image file stores the effective data; and
   wherein, when a bit corresponding to the second corresponding particular sector in any parent bitmap of the data block being searched indicates that the second corresponding particular sector does not store the effective data, the determining whether the record of the second corresponding particular sector in the parent bitmap does not store the effective data further includes determining that the second corresponding particular sector in the parent image file does not store the effective data.

9. The method as recited in claim 1, wherein the effective data block in the position subsequent to the garbage data block is a particular effective data block that has a position after the position of the garbage data block in a physical storage space of the image file.

10. The method as recited in claim 1, wherein the moving the effective data block from a position located subsequent to the garbage data block comprises copying data in the effective data block to the position of the garbage data block.

11. The method as recited in claim 1, wherein the shrinking the size of the image file after the moving comprises:
   forming an unused space at an end of the image file after the moving;
   cutting the unused space from the image file; and
   obtaining an image file whose size is reduced.

12. An apparatus comprising:
   a garbage data block searching module that
      searches, among one or more data blocks, for a garbage data block in an image file, the image file including the one or more data blocks and a block allocation table (BAT) that records information of each data block, the garbage data block not storing effective data, and the image file including a set of files into a single file according to a certain format, and
      revises a record corresponding to the garbage data block in the BAT to indicate that there is no effective data stored in the garbage data block;
   a data moving module that
      moves an effective data block from a position located subsequent to the garbage data block to a position of the garbage data block, the position located subsequent to the garbage data block being nearer to an end of the image file than the position of the garbage data block, and
      revises a record of a new location of the effective data block in the BAT after the effective data block is moved; and
   a file shrinking module that shrinks the image file after the movement of data blocks is completed.

13. The apparatus as recited in claim 12, wherein each of the one or more data blocks includes:
   one or more sectors, and
   a bitmap that records information of each sector.

14. The apparatus as recited in claim 13, wherein the apparatus further includes a garbage sector searching module that
   searches for a particular bitmap of the data block being searched, and
   determines if the data block being searched, sectors of which are all indicated as garbage sectors according to records of the sectors in the bitmap, is the garbage data block.

15. The apparatus as recited in claim 14, wherein the garbage sector searching module includes:
   a bitmap searching sub-module that
      searches the particular bitmap in the data block being searched of the image file, and when a record to a particular sector in the bitmap indicates that there is data stored in the particular sector, triggers a determination sub-module; and
the determination sub-module that determines a type of the image file,
wherein, when the type of the image file is determined to be a dynamic hard disk image file, in response to a determination that data in the particular sector is not effective data, the determination sub-module further determines the particular sector to be the garbage sector, and
wherein, when the type of the image file is determined to be a differencing hard disk image file, in response to a determination that data stored in the particular sector is the same as data stored in a corresponding particular sector with a same sector location in a parent image file, the determination sub-module further determines the particular sector to be the garbage sector.

16. The apparatus as recited in claim 14 wherein, when determined that the image file is a dynamic hard disk image file, the garbage sector searching module includes:
an obtaining sub-module that obtains:
a source bitmap of the data block being searched of the image file, and
a block bitmap of the data block being searched, which block bitmap indicates whether the corresponding particular sector stores effective data; and
a comparison sub-module that:
compares every bit between the source bitmap and the block bitmap, and
when a record of the particular sector in the source bitmap indicates that the particular sector stores effective data while a record of the corresponding particular sector in the block bitmap indicates that the corresponding particular sector does not store effective data, determines the particular sector to be the garbage sector.

17. The apparatus as recited in claim 14, wherein, when determined that the image file is a differencing hard disk image file, the garbage sector searching module includes:
an obtaining sub-module that obtains:
a source bitmap of the data block being searched of the image file,
a block bitmap of the data block being searched, which block bitmap indicates whether a first corresponding particular sector stores effective data, and
a parent bitmap of the same data block being searched in the ancestor image file; and
a comparison sub-module that:
compares each bit between the source bitmap, the block bitmap, and the parent bitmap, and
when a record of the particular sector in the source bitmap indicates that the particular sector stores effective data while a record of a second corresponding particular sector in the parent bitmap indicates that the second corresponding particular sector does not store effective data and a record of the first corresponding particular sector in the block bitmap indicates that the first corresponding particular sector does not store effective data, determines the particular sector to be the garbage sector.

18. The apparatus as recited in claim 12, wherein the file shrinking module:
forms an unused space at an end of the image file after the moving,
cuts the unused space from the image file, and
obtains an image file with reduced size.

19. A memory comprising computer-executable instructions executable by a processor that, when executed by the processor, cause the processor to perform operations comprising:
searching, among one or more data blocks, for a garbage data block in an image file, the image file including the one or more data blocks and a block allocation table (BAT) that records information of each data block, the garbage data block not storing effective data, and the image file including a set of files into a single file according to a certain format;
revising a record of the garbage data block in the BAT to indicate that there is no effective data stored in the garbage data block;
moving an effective data block from a position located subsequent to the garbage data block to a position of the garbage data block, the position located subsequent to the garbage data block being nearer to an end of the image file than the position of the garbage data block;
revising a record of a new location of the effective data block in the BAT after the moving; and
shrinking a size of the image file after the moving.

20. The memory as recited in claim 19, wherein each of the one or more data blocks includes:
one or more sectors, and
a bitmap that records information of each sector.

* * * * *